No. 870,677. PATENTED NOV. 12, 1907.
M. HEBTING.
POTATO DIGGER AND SHAKER.
APPLICATION FILED SEPT. 26, 1906.

2 SHEETS—SHEET 1.

Witnesses
Thos. W. Riley
Lucie Anderson

Inventor
Martin Hebting

By W. J. FitzGerald & Co.,
Attorneys

No. 870,677. PATENTED NOV. 12, 1907.
M. HEBTING.
POTATO DIGGER AND SHAKER.
APPLICATION FILED SEPT. 26, 1906.

2 SHEETS—SHEET 2.

Witnesses
Thos. W. Riley
Lucie Anderson

Inventor
Martin Hebting
By W. T. FitzGerald & Co.,
Attorneys

UNITED STATES PATENT OFFICE.

MARTIN HEBTING, OF KAW, OKLAHOMA TERRITORY.

POTATO DIGGER AND SHAKER.

No. 870,677.　　　　Specification of Letters Patent.　　　Patented Nov. 12, 1907.

Application filed September 26, 1906. Serial No. 336,310.

*To all whom it may concern:*

Be it known that I, MARTIN HEBTING, a citizen of the United States, residing at Kaw, in the county of Kay and Territory of Oklahoma, have invented certain new and useful Improvements in Potato Diggers and Shakers; and I do hereby declare the following to be a full, clear, and exact description of the invention, such as will enable others skilled in the art to which it appertains to make and use the same.
My invention relates to new and useful improvements in diggers, and more particularly to that class adapted to be used in digging potatoes, and my object is to provide a device whereby the potatoes will be separated from the earth and carried to the upper end of the digger where they are deposited into any suitable receptacle or directed upon the top of the ground.

A further object is to provide means for adjusting the digging apparatus whereby the same will be directed at different depths into the earth.
A still further object is to provide means for pulling the vines and weeds from the earth so that they will be readily carried to the upper end of the digger and discharged.

Other objects and advantages will be hereinafter referred to and more particularly pointed out in the claims.

Figure 1:
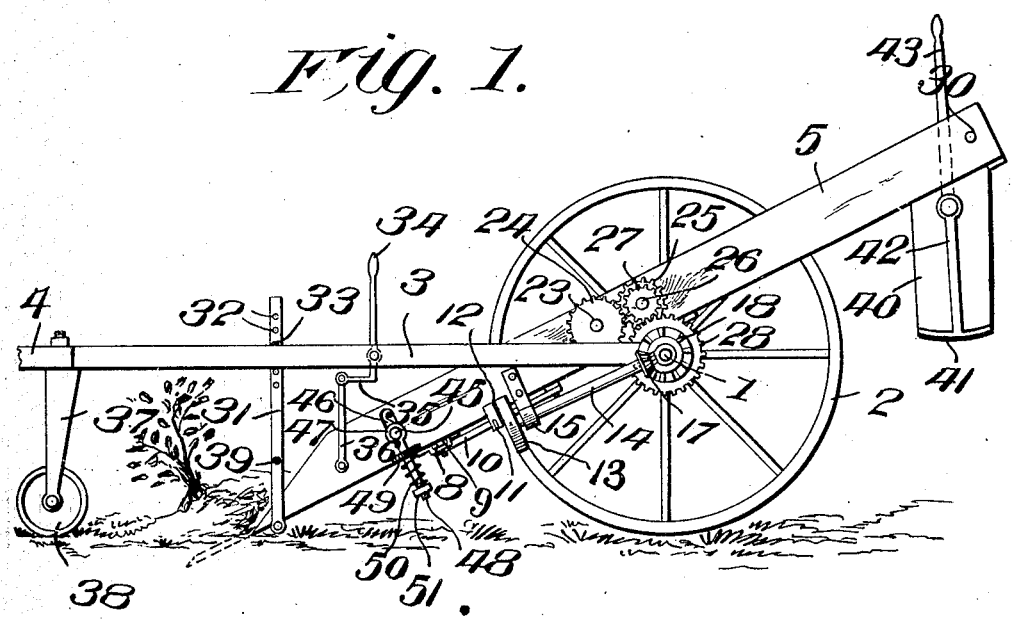
Figure 2:
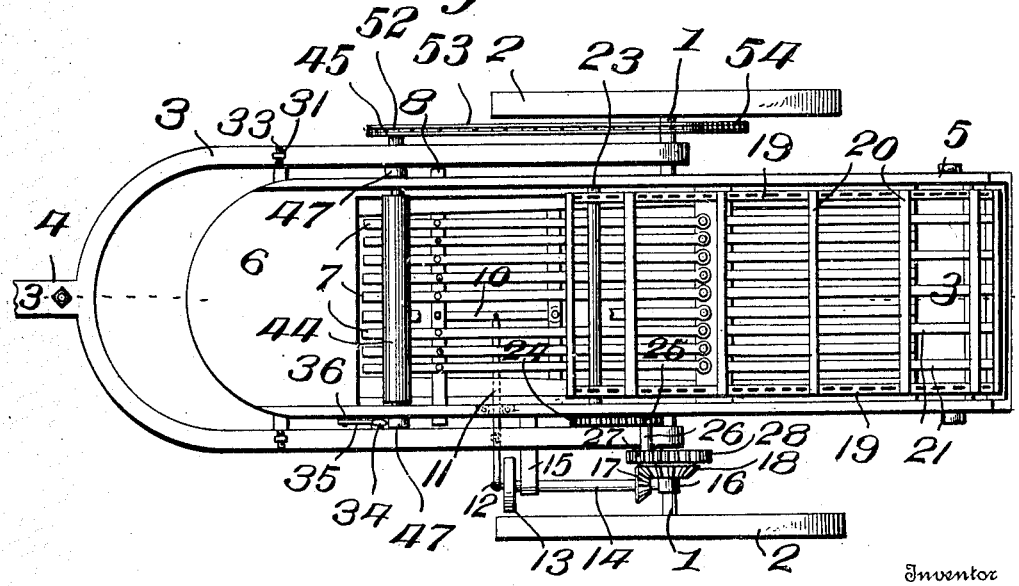
Figure 3:
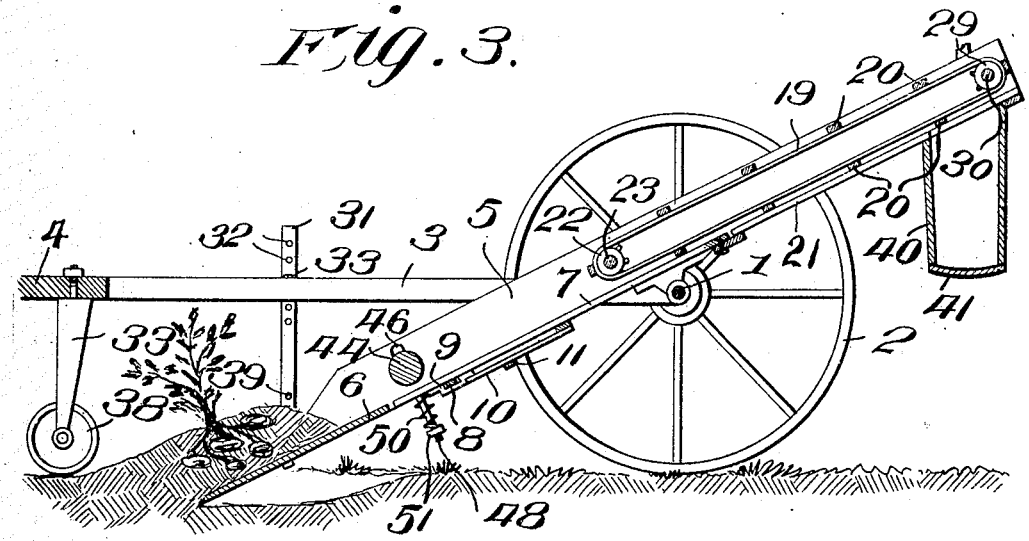
Figure 4:
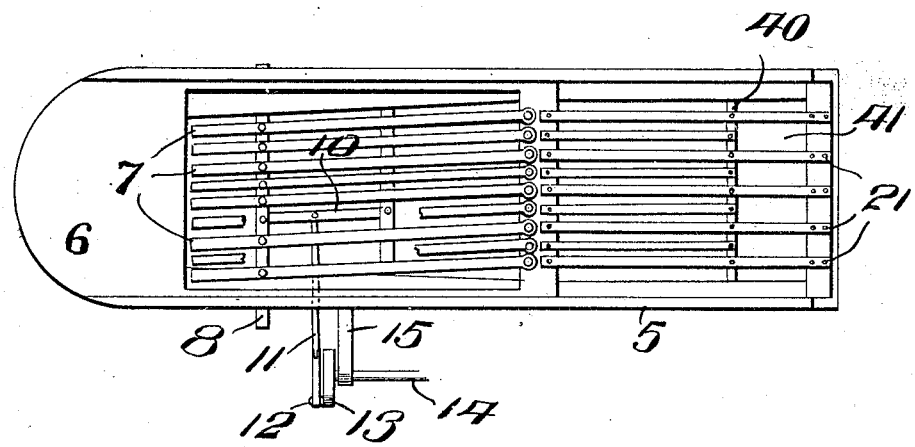

In the accompanying drawings which are made a part of this application: Figure 1 is a side elevation of my improved digger showing the same in operation.
Fig. 2 is a top plan view thereof. Fig. 3 is a central longitudinal sectional view as seen from line 3—3 Fig. 2, and, Fig. 4 is a detail plan view of the digging mechanism removed from its supporting frame.

Referring to the drawings in which similar reference numerals designate corresponding parts throughout the several views, 1 indicates an axle to each end of which is secured a suitable carrying wheel 2.

Secured to the axle 1 in any preferred manner are the free ends of a substantially U-shaped frame 3 having a tongue 4 secured to the outer end thereof.

Mounted upon the axle 1 and between the ends of the frame 3 is a conveyer frame 5, to the lower inclined end of which is secured a plow or digger 6, which is adapted to enter the ground and deposit potatoes and earth into the lower end of the conveyer frame. Immediately in the rear of the plow 6 is a shaker, which is composed of a plurality of strips 7, which are pivotally secured to the conveyer frame 5 at their upper ends, and are connected together near their lower ends by means of a slide bar 8, said slide bar being secured to the lower edge of the conveyer frame 5 by means of suitable brackets 9 and in which the bar 8 is adapted to reciprocate.

An auxiliary strip 10 is disposed below the strips 7 and has one of its ends pivotally secured to the conveyer frame 5, while the opposite end thereof is pivoted to the slide bar 8, the auxiliary strip 10 having a pitman 11 secured to the central portion thereof and directed to one side of the conveyer frame, where it is secured to a wrist pin 12 carried by the usual form of operating wheel 13. The wheel 13 is in turn mounted upon the end of the driving shaft 14, which is mounted at one end in a suitable bearing 15 carried by the conveyer frame and at its opposite end in a bearing 16 on the axle 1, the inner end of said shaft having a pinion 17 mounted thereon which is disposed into mesh with a beveled gear 18, fixedly secured to the axle 1, so that when the digger is moved forward the strips 7 will be oscillated through the medium of the pitman 11, thereby separating the potatoes from the earth, the earth falling through between the strips 7, while the potatoes are moved upwardly in the conveyer frame until they are engaged by a carrier 19, the slats 20 of which extend across the conveyer frame, so that when the slats engage the potatoes, they will be moved to the upper end of the frame and deposited in any suitable receptacle or directly upon the ground. The carrier 19 is disposed above the pivoted ends of the strips 7 and a plurality of fixed strips 21 at the upper end of the conveyer frame, and is driven through the medium of a pair of sprockets 22 mounted upon a shaft 23, which extends laterally through the conveyer frame 5, and has a gear 24 secured to one end thereof which is adapted to mesh with a similar gear 25 secured to a stub shaft 26.

Secured to the opposite end of the shaft 26 is a gear 27, which is adapted to mesh with a large gear 28 upon the axle 1 and through the medium of which the carrier 19 is operated. The upper end of the carrier 19 is disposed around a pair of idlers 29, which are mounted upon a shaft 30 at the upper end of the carrier frame. The forward end of the conveyer frame 5 is adjustably secured to the frame 3 by means of arms 31, said arms being pivotally secured at their lower ends to the conveyer frame 5 and extend upwardly through slots in the frame 3, said arms being provided with a plurality of openings 32, in which is adapted to take a cotter pin or the like 33, so that when the forward end of the conveyer frame has been raised or lowered the proper distance the pins 33 are disposed through one of the openings 32 immediately above the edge of the frame 3, thereby limiting the downward movement of the forward end of the conveyer frame 5, and at the same time leaving the conveyer frame free to be lifted upwardly when desired. In order to manually elevate the forward end of the conveyer frame and the plow secured thereto, I have provided a lever 34, which is pivotally secured to the frame 3, and is provided at its lower end with a right angled extension 35, to which is pivotally secured a link 36, the lower end of which is pivoted to the side of the conveyer frame 5, so that when it is desired to elevate the lower end of the conveyer frame and disengage the plow from the ground, the upper end of the lever 34 may be moved rearwardly, which will result in raising the plow and the lower end of the conveyer frame.

A standard 37 is secured to the tongue 4 near its juncture with the frame 3, to the lower end of which is secured a wheel 38 and by which means the forward end of the frame 3 is supported above the ground and normally held in a horizontal position. When the digger is not in use the forward end of the conveyer frame is elevated until the opening 39 in the arms 31 is disposed above the frame 3, and the cotter pin 33 disposed through the opening 39, thereby disposing the plow 6 entirely out of engagement with the earth, so that the digger may be freely moved from place to place.

To more conveniently retain the potatoes and deposit them in bulk upon the ground or into any suitable receptacle, I have provided at the rear end of the conveyer frame 5, a hopper 40 into which are deposited the potatoes as they are elevated by the carrier 19 and in order to readily deposit the potatoes into the hopper a portion of the fixed strips 21 are made shorter than the remainder of the strips so that the potatoes will freely drop into the hopper. I have also provided a swinging closure 41 for the lower end of the hopper 40, said closure being supported by means of arms 42 which are pivotally secured to the side of the hopper and in order to conveniently operate the closure, one of the arms is provided with a handle 43 thereby enabling me to readily dispose the closure into or out of engagement with the lower end of the hopper. By this construction it will be readily seen that when the potatoes are conveyed to the upper end of the conveyer frame 5 that they will be deposited in the hopper and remain therein until such time as it is desired to deposit the same directly upon the ground or into a receptacle and this result is accomplished by swinging the closure 41 to one side of the hopper.

In order to readily extract the weeds and vines from the earth and prevent the same from becoming clogged within the conveyer frame, I have provided a suitable pulling device consisting of a roller 44 which is disposed across the lower end of the conveyer frame 5 and into the path of the ascending earth and particles carried thereby, the supporting shafts 45 of the roller 44 extending through slots 46 in the sides of the conveyer frame and being seated in the heads 47 of retaining bolts 48, said bolts extending through ears 49 on the outer face of the conveyer frame 5, the bolts being yieldingly held in engagement with said ears by means of springs 50 which are disposed around the bolts and are held in position thereon by means of nuts 51 and 50 by this construction it will be seen that the roller 44 can readily adjust itself to accommodate the different bulk of earth directed into engagement therewith.

The roller 44 is adapted to rotate at a greater speed than the earth is traveling thereunder so that the roller will readily engage the vines and weeds carried by the earth and extract the same therefrom and to this end one of the supporting shafts 45 is elongated and provided with a sprocket wheel 52 around which is disposed a sprocket chain 53 which is in turn directed around a driving sprocket 54 carried by the shaft 1. It will now be seen that by extracting the vines and weeds contained in the earth that the same will be thrown loosely into engagement with the carrier 19 and be moved to the upper end of the strips 21 where they will be deposited directly upon the ground. It will also be seen that the springs 50 will retain the roller into engagement with the vines etc., at all times. By this construction it will be seen that I have provided a very cheap, durable and efficient device for digging the potatoes and separating the same from the earth and it will also be seen that I have provided convenient means for collecting the potatoes whereby the same may be deposited in bulk into any suitable receptacle or upon the ground and it will also be seen that the weeds and vines will be readily separated from the potatoes and deposited in the rear of the digger.

What I claim is;

1. In a digger of the class described, the combination with an inclined conveyer frame and means to support and adjust the same, of a carrier in said frame, longitudinally-disposed slats beneath said carrier, a shaker in the lower portion of said frame, and means to move said shaker laterally, and a pulling device mounted in the forward end of said frame over the free end of the shaker.

2. In a digger of the class described, the combination with an inclined conveyer frame and means to support and adjust the same, of a carrier in said frame, longitudinally-disposed slats beneath said carrier, a shaker in the lower portion of said frame, and means to move said shaker laterally, a pulling device mounted in the forward end of said frame over the free end of the shaker, and means for allowing the said pulling device to automatically adjust itself to differing bulks of earth.

In testimony whereof I have signed my name to this specification in the presence of two subscribing witnesses.

MARTIN HEBTING.

Witnesses:
  CHAS. SPENCER,
  C. B. BENDURE.